(12) United States Patent
Ward et al.

(10) Patent No.: US 7,708,904 B2
(45) Date of Patent: May 4, 2010

(54) CONDUCTIVE HYDROCARBON FLUID

(75) Inventors: Douglas E. Ward, Santa Ana, CA (US); Jason A. Sherlock, Santa Ana, CA (US)

(73) Assignee: Saint-Gobain Ceramics & Plastics, Inc., Worcester, MA (US)

(*) Notice: Subject to any disclaimer, the term of this patent is extended or adjusted under 35 U.S.C. 154(b) by 957 days.

(21) Appl. No.: 11/242,635

(22) Filed: Oct. 3, 2005

(65) Prior Publication Data
US 2007/0057225 A1 Mar. 15, 2007

Related U.S. Application Data

(60) Provisional application No. 60/715,843, filed on Sep. 9, 2005.

(51) Int. Cl.
*C09K 13/00* (2006.01)
(52) U.S. Cl. .............. 252/79.1; 252/79.4; 51/308; 216/88; 216/89; 438/692
(58) Field of Classification Search ........... 252/79.1, 252/79.4; 216/88, 89; 438/692; 51/308
See application file for complete search history.

(56) References Cited

U.S. PATENT DOCUMENTS

| 3,449,097 | A | | 6/1969 | Andress, Jr. | |
|---|---|---|---|---|---|
| 4,171,958 | A | | 10/1979 | Willcox | |
| 4,202,787 | A | | 5/1980 | Davis | |
| 4,259,087 | A | | 3/1981 | Naiman et al. | |
| 4,333,741 | A | | 6/1982 | Naiman et al. | |
| 4,356,002 | A | | 10/1982 | Knepper et al. | |
| 4,388,452 | A | | 6/1983 | Naiman et al. | |
| 4,710,427 | A | * | 12/1987 | Yamauchi et al. | 428/407 |
| 4,869,991 | A | * | 9/1989 | deGraft-Johnson et al. | 430/115 |
| 5,374,372 | A | * | 12/1994 | Broze et al. | 8/137 |
| 5,409,630 | A | * | 4/1995 | Lysy et al. | 510/401 |
| 5,437,887 | A | | 8/1995 | Yarkosky et al. | |
| 5,641,841 | A | | 6/1997 | Diaz et al. | |
| 5,744,431 | A | | 4/1998 | Diaz et al. | |
| 5,973,027 | A | * | 10/1999 | Howald et al. | 523/160 |
| 6,372,648 | B1 | * | 4/2002 | Hall et al. | 438/692 |
| 6,423,125 | B1 | | 7/2002 | Ishibashi et al. | |
| 6,447,373 | B1 | | 9/2002 | Lack et al. | |
| 6,461,227 | B1 | | 10/2002 | Fang | |
| 6,471,884 | B1 | | 10/2002 | Fang et al. | |
| 6,569,215 | B2 | | 5/2003 | Miyata | |
| 6,602,439 | B1 | | 8/2003 | Hampden-Smith et al. | |
| 6,627,675 | B1 | * | 9/2003 | Finnie et al. | 523/122 |
| 6,755,721 | B2 | | 6/2004 | Ward et al. | |
| 7,093,722 | B2 | * | 8/2006 | Grumbine | 210/526 |
| 2001/0049913 | A1 | | 12/2001 | Miyata | |
| 2002/0139055 | A1 | * | 10/2002 | Asano et al. | 51/308 |
| 2003/0032380 | A1 | | 2/2003 | Sommer et al. | |
| 2003/0051413 | A1 | * | 3/2003 | Sakai et al. | 51/307 |
| 2003/0134575 | A1 | | 7/2003 | Fang | |
| 2003/0191037 | A1 | * | 10/2003 | Rindo et al. | 510/185 |
| 2004/0111976 | A1 | * | 6/2004 | Buehler | 51/308 |
| 2005/0092620 | A1 | * | 5/2005 | Mavliev et al. | 205/662 |
| 2005/0136670 | A1 | * | 6/2005 | Ameen et al. | 438/691 |
| 2007/0221089 | A1 | * | 9/2007 | Hasinovic et al. | 106/10 |

FOREIGN PATENT DOCUMENTS

| EP | 0 280 438 A2 | 8/1988 |
|---|---|---|
| EP | 0 829 531 A1 | 3/1998 |
| EP | 1 491 331 A | 12/2004 |
| GB | 795 683 A | 5/1958 |
| GB | 1 409 019 A | 10/1975 |
| JP | 57-073006 | 5/1982 |
| JP | 02-258802 | 10/1990 |
| JP | 9095471 A2 | 4/1997 |
| JP | 11012563 | 1/1999 |
| JP | 2003-268115 | 9/2003 |
| WO | WO 97/18562 | 5/1997 |
| WO | WO 97/25392 | 7/1997 |
| WO | WO 97/44415 | 11/1997 |
| WO | WO 01/02134 A1 | 1/2001 |
| WO | WO 01/09482 A | 2/2001 |
| WO | WO 01/12740 | 2/2001 |
| WO | WO 01/19935 | 3/2001 |
| WO | WO 01/36554 A1 | 5/2001 |
| WO | WO 01/38461 A1 | 5/2001 |
| WO | WO 01/74959 A2 | 10/2001 |
| WO | WO 02/18398 A1 | 3/2002 |
| WO | WO 02/22765 A2 | 3/2002 |
| WO | WO 03/070860 A1 | 8/2003 |
| WO | WO 2004/013260 A1 | 2/2004 |
| WO | WO 2004/024850 A1 | 3/2004 |
| WO | WO 2004/029180 A1 | 4/2004 |

OTHER PUBLICATIONS

Zipperian, Ph.D, Donald C. and Raghavan, Srini; "GMR and TMR Corrosion Issues and Solutions for Magnetic Read-Write Devices"; Insight, The Online Journal of IDEMA; 2005.
Galvin, Ph.D, Gregory J.; "Inertial Sensing for Hard Disk Drive Drop Protection"; Insight, the Online Journal of IDEMA; 2005.
OCTEL; Material Safety Data Sheet; Octastat (R) 3000; Dec. 19, 2003.
OCTEL; Performance Chemicals; Product Bulletin; Octastat in Solvent Applications.
OCTEL; The Shocking facts About Static in Liquids.
Technology Information Services; Search Results.
Wikipedia, the free encyclopedia, "Imidazole".
Wikipedia, the free encyclopedia, Aliphatic compound.

* cited by examiner

*Primary Examiner*—Shamim Ahmed
(74) *Attorney, Agent, or Firm*—Larson Newman & Abel, LLP

(57) ABSTRACT

The disclosure is directed to a processing fluid including an aliphatic hydrocarbon component having an average chain length of 8 to 16 carbons and about 0.0001 wt % to about 50.0 wt % of a Lewis active component.

22 Claims, No Drawings

CONDUCTIVE HYDROCARBON FLUID

CROSS-REFERENCE TO RELATED APPLICATION

The present application claims priority from U.S. provisional patent application No. 60/715,843, filed Sep. 9, 2005, entitled "CONDUCTIVE HYDROCARBON FLUID," naming inventors Doug E. Ward and Jason A. Sherlock, which application is incorporated by reference herein in its entirety.

FIELD OF THE DISCLOSURE

This disclosure, in general, relates to conductive hydrocarbon fluids.

BACKGROUND

Manufacturers are increasingly turning to exotic metals and ceramics to form intricate components, and in particular, to form electronic components. In this respect, metals such as iridium, manganese, cobalt, and platinum, are useful in forming components, such as read-write heads of magnetic storage devices.

Often, such components are formed using processes, such as lapping, grinding, polishing, and cleaning. These processes typically use fluids to transfer heat and swarf from component surfaces. However, typical processing fluids are water-based and can lead to corrosion and undesirable oxidation of component surfaces formed of metals and ceramics.

To prevent corrosion and oxidation, manufactures are turning to hydrocarbon-based fluid formulations. However, typical hydrocarbon formulations have low conductivity and can lead to electrostatic build-up in articles being formed. Electrostatic discharge in such articles can result in damaged components or components with poor surface and performance qualities. Typically, damaged and poor performing components are generally discarded, leading to increased production costs.

As such, an improved processing fluid and method of forming components would be desirable.

SUMMARY

In a particular embodiment, the disclosure is directed to a processing fluid including an aliphatic hydrocarbon component having an average chain length of 8 to 16 carbons and about 0.0001 wt % to about 50.0 wt % of a Lewis active component.

In another exemplary embodiment, the disclosure is directed to a lapping fluid including at least about 50.0 wt % non-polar hydrocarbon component and not greater than about 1.0 wt % water. The lapping fluid has a conductance at least about 10 nS/m.

In a further exemplary embodiment, the disclosure is directed to a lapping fluid having a specific gravity of about 0.7 to about 0.9 and conductivity at least about 10 nS/m.

The disclosure is also directed to a method of forming an article. The method includes contacting a processing surface of a processing tool to a location on a surface of an article and providing a processing fluid to the location while contacting the surface of the article with the processing surface of the processing tool. The processing fluid has a specific gravity of about 0.7 to about 0.9 and a conductivity at least about 10 nS/m. The method further includes cleaning the surface of the tooled article.

In addition, the disclosure is directed to a processing fluid including at least about 50.0 wt % aliphatic hydrocarbon component, about 1.0 wt % to about 25.0 wt % glycol ether component, about 0.005 wt % to about 5.0 wt % ionic polymer component, and about 0.1 wt % to about 5.0 wt % carboxylic acid functional component.

DESCRIPTION OF THE PREFERRED EMBODIMENT(S)

In a particular embodiment, a processing fluid is provided that includes a hydrocarbon component and a Lewis active component. Exemplary embodiments of the processing fluid may include more than one Lewis active component and, in particular, the processing fluid may include at least one Lewis acid and at least one Lewis base. In addition, the processing fluid may include a polar component, such as a glycol ether component. The processing fluid may also include abrasive particulate. Particular embodiments of the processing fluid may be used as lapping fluids or cleaning fluids.

In an exemplary embodiment, the processing fluid includes a hydrocarbon component. In an example, the hydrocarbon component is a polar hydrocarbon component, such as a glycol component. Alternatively, the hydrocarbon component is a non-polar hydrocarbon component, such as an aliphatic hydrocarbon component. The aliphatic hydrocarbon component may include at least 8 carbons. For example, the aliphatic hydrocarbon component may include 8 to 16 carbons, such as 10 to 14 carbons or 10 to 12 carbons. In an example, the aliphatic hydrocarbon component is a blend of aliphatic hydrocarbons having an average of 8 to 16 carbons, such as an average of 10 to 14 carbons or an average of 10 to 12 carbons. Alternatively, the aliphatic hydrocarbon component consists essentially of a single aliphatic hydrocarbon having a chain length of 8 to 16 carbons, such as 10 to 14 carbons or 10 to 12 carbons. The aliphatic hydrocarbon component may be a straight chain hydrocarbon component. In general, the aliphatic hydrocarbon component is a linear or branched chain molecule, free of Lewis active functional groups.

In an exemplary embodiment, the processing fluid includes at least about 50.0 wt % aliphatic hydrocarbon component based on the total weight of the processing fluid. For example, the processing fluid may include about 50.0 wt % to about 99.5 wt % aliphatic hydrocarbon component, such as about 65.0 wt % to about 95.0 wt %. Particular embodiments of the processing fluid include about 80.0 wt % to about 90.0 wt % aliphatic hydrocarbon component.

Exemplary embodiments of the Lewis active component include Lewis acids and Lewis bases and, in particular, include organic components having a Lewis active functional group, such as a functional group that may act as a Lewis acid or a functional group that may act as a Lewis base. In general, Lewis active functional groups are configured to accept a pair of electrons (i.e., a Lewis acid), or to donate a pair of electrons (i.e., a Lewis base). Lewis active components may be, for example, Bronsted-Lowry acids or bases or Arrehnius acids or bases. For example, a Lewis active component may be a Bronsted-Lowry active component, such as a Bronsted-Lowry acid or a Bronsted-Lowry base. In particular, a Bronsted-Lowry acid may be, for example, an organic carboxylic acid and a Bronsted-Lowry base may be, for example, an organic component having an amine functional group.

In an exemplary embodiment, the Lewis active component is an organic component having a Lewis active functional group. The organic component may have a functional group selected from the group consisting of a carboxylic acid, an amine, an imidazole, an imidazoline, a phosphate, a phosphonate, a sulfate, a sulfonate, an alkene, and their associated salt. A particular embodiment of a Lewis active component includes an ionic functional group, such as a carboxylic acid, an amine, a phosphate, a phosphonate, a sulfonate, or a sulfonate functional group.

In a particular embodiment, the Lewis active component exhibits a pKa or pKb value not greater than 14.0 at 25° C. depending on whether the Lewis active component is a Lewis acid or a Lewis base, respectively. For example, a Lewis acid component may have a pKa at least about 0.0 and not greater than 14.0 at 25° C., such as not greater than 12.0, not greater than 11.0, or not greater than 10.0. When the Lewis acid component behaves a Bronsted-Lowry acid, the pKa is the negative logarithm of the acid dissociation constant Ka, (i.e., pKa=−log Ka). In contrast, functional groups such as alcohols and methylene typically are not Lewis acid functional components because they have pKa values greater than 14.0. In another example, a Lewis base component may have a pKb at least about 0.0 and not greater than 14.0 at 25° C., such as not greater than 12.0, not greater than 11.0, or not greater than 10.0. When the Lewis base component behaves a Bronsted-Lowry base, the dissociation constant may be, for example, derived for the conjugate acid according to the reaction, $B+H_2O \leftrightarrow BH^+ + OH^-$. The pKb is, for example, calculated from the equation, pKb=pKwater−pKa, where pKwater=14.0 at 25° C. In contrast, functional groups such as amides, ethers and ketones are not considered Lewis base functional components because they have pKb values greater than 14.0. However, components containing such functional groups are considered Lewis active components if they also include at least one Lewis active functional group, such as a carboxylic acid, an amine, an imidazole, an imidazoline, a phosphate, a phosphonate, a sulfate, a sulfonate, or their associated salt. In a further example, the Lewis active component may be an organic component having more than one Lewis active functional group.

An exemplary Lewis active component may be an organic component having a carboxylic acid functional group, and, in particular, may be a carboxylic functional organic component having at least six carbons, such as octanoic acid, 9-octadecanoic acid, benzoic acid, or polyacrylic acid. An exemplary organic component including an amine functional group may be 1-aminohexane, N-hexyl hexylamine, 1-amino-2-propanol, diethanolamine, triethanolamine, or polyvinylamine. An exemplary imidazoline function organic component may be 1-hydroxyethyl-2-octylimidazoline and an exemplary imidazole component may be 2-methylimidazole. Exemplary phosphate and phosphonate components include an alkyl phosphate acid ester, phosphoric acid didecyl ester, decylphosphonic acid decyl ester, 1-hydroxyethylidene-1,1-diphosphonic acid (HEDP), aminotri(methylenephosphonic acid) (ATMP), N-(2-hydroxyethyl)-N,N-di (methylenephosphonic acid) (HEMPA), or 2-phosphonobutane-1,2,4-tricarboxylic acid (PBTC). Particular embodiments of phosphate and phosphonate functional organic components may include at least six carbons. In particular, the Lewis active component may include a molecule having at least six carbons and an alkyl phosphate acid ester functional group. An organic component having a sulfonate functional group may include at least six carbons, such as, for example, dodecylbenzene sulfonic acid, toluene sulfonic acid, dinonylnaphthylsulfonic acid, or sulfonated polyacrylic acid.

In an exemplary embodiment, the Lewis active component is a polymer having one or more Lewis active functional groups, such as an ionic polymer, or a polymer having a carbon backbone with repeating carbon-carbon double bonds capable of conveying electron charge. In an example, an ionic polymer includes a functional group, such as a Lewis active functional group including nitrogen, a Lewis active functional group including oxygen or a Lewis active functional group including sulfur. A particular embodiment of a Lewis active polymer may be a polymer, a polymer blend, or a copolymer of monomers having a Lewis active functional group including oxygen, nitrogen, sulfur, or combinations thereof. Alternatively, the polymer may be modified or treated to form Lewis active sites. In an exemplary embodiment, the polymer is polyacrylic acid, polyalkene, polyvinylamine, or sulfonated polyacrylic acid. A particular embodiment of a Lewis active polymer is found in Octastat® products, such as Octastat® 2000, Octastat® 3000, or Octastat® 4065 available from Octel Performance Chemicals, Chesire, UK.

Another exemplary embodiment of the organic component may be a component having at least one Lewis active functional group, such as, for example, octanoic acid, 9-octadecenoic acid, benzoic acid, polyacrylic acid, polydiacetylenes, 2-aminohexadecanoic acid, 1-aminohexane, N-hexyl hexylamine, 1-amino-2-propanol, polyvinylamine, triethanolamine, 1-hydroxyethyl-2-octylimidazoline, 2-methylimidazole, phosphoric acid didecyl ester, decylphosphonic acid decyl ester, dodecylbenzene sulfonic acid, toluene sulfonic acid, dinonylnaphthylsulfonic acid, sulfonated polyacrylic acid, glycerin mono oleate, or their salts.

In an exemplary embodiment, the processing fluid includes at least one Lewis acid and at least one Lewis base. For example, the processing fluid may include an organic component having a carboxylic acid functional group and an organic component having an amine functional group. In another exemplary embodiment, the processing fluid may include a blend of polymers, one polymer having a Lewis acid functional group and another polymer having a Lewis base functional group. In a further example, the processing fluid may include a polymer having a Lewis base functional group and an organic component including a Lewis acid functional group. In a particular embodiment, the processing fluid may include organic salts formed of a Lewis acid component and a Lewis base component. Further, an exemplary processing fluid may include an Arrehnius acid and an Arrehnius base or may include a Bronsted-Lowry acid and a Bronsted-Lowry base.

The Lewis active component may form about 0.0001 wt % to about 50.0 wt % of the processing fluid based on the total weight of the processing fluid. For example, the processing fluid may include about 0.005 wt % to about 10.0 wt % Lewis active component, such as about 0.01 wt % to about 5.0 wt % Lewis active component.

The processing fluid may further include a polar organic component. Particular polar components improve miscibility of Lewis active organic components and may improve stability and homogeneity of the processing fluid mixture. An exemplary embodiment of the polar component includes an amide, an alcohol, an ether, or dialkyl sulfide functional group. For example, the polar component may be an organic component having an alcohol functional group or an ether functional group and having at least 6 carbons. In another example, the polar component is an organic glycol ether component having at least 6 carbons. An exemplary polar component may be 2-ethyl-1-hexanol, 2-butoxy ethanol, 1-butoxy-2-propanol, 2-decylthiol ethanol, nonylphenol pentaglycol ether, octadecenol tetraglycol ether, dipropylene glycol mono butyl ether, ethylene glycol mono hexyl ether, soya amide, ethoxylated octylphenol, or ethoxylated nonylphenols. In a particular embodiment, the polar organic component has a pKa or pKb value that is greater than 14.0 at 25° C.

In an exemplary embodiment, the processing fluid includes about 0.1 wt % to about 50.0 wt % polar component based on the total weight of the processing fluid. For example, the processing fluid may include about 1.0 wt % to about 25.0 wt % polar component, such as about 1.0 wt % to about 15.0 wt % polar component or about 1.0 wt % to about 8.0 wt % polar component.

Particular embodiments of the processing fluid may be useful in fixed abrasive processes. Alternatively, the processing fluid may be configured for free abrasive processes and, as such, may include abrasive particulate. For example, the processing fluid may include abrasive particulate in an amount about 0.05 wt % to about 5.0 wt % of the processing fluid. In an example, the processing fluid may include about 0.1 wt % to about 1.0 wt % abrasive particulate. In an exemplary embodiment, the abrasive particulate has an average particle size of about 10 nm to about 500 nm, such as about 50 nm to about 200 nm or about 50 nm to about 100 nm. An exemplary abrasive particulate may be a diamond particulate or a coated diamond particulate, such as an amorphous carbon coated diamond particulate. Another exemplary abrasive particulate includes a ceramic, such as a carbide, a nitride, or an oxide ceramic. An exemplary carbide ceramic includes silicon carbide or boron carbide. An exemplary nitride includes silicon nitride or boron nitride, and an exemplary oxide includes alumina; silica, ceria, or zirconia. In some embodiments, the abrasive particulate, such as diamond particulate, attenuates conductivity. As such, the amount of abrasive particulate may affect the conductivity of a fluid having a particular amount of Lewis active component.

The processing fluid is hydrocarbon based and, typically, includes not greater than about 10.0 wt % water. For example, the processing fluid may include not greater than about 5.5 wt % water, such as not greater than about 1.0 wt % water. Exemplary embodiments of the processing fluid include less than about 1.0 wt % water, such as not greater than about 0.5 wt % water. In a particular embodiment, the processing fluid includes no added water beyond that hygroscopically absorbed by the processing fluid or the components thereof.

In an exemplary embodiment, the processing fluid includes at least about 50 wt % aliphatic hydrocarbon component, about 1.0 wt % to about 25.0 wt % polar component, such as glycol ether, about 0.005 wt % to about 5.0 wt % ionic polymer component, and about 0.1 wt % to about 5.0 wt % carboxylic acid functional component. The exemplary processing fluid may include not greater than about 1.0 wt % water. In addition, the exemplary processing fluid may include 0.1 wt % to about 5.0 wt % abrasive particulate.

In another exemplary embodiment, the processing fluid includes about 65 wt % to about 95 wt % aliphatic hydrocarbon, about 1.0 wt % to about 15.0 wt % polar component, such as glycol ether, about 0.05 wt % to about 5.0 wt % carboxylic acid functional component, about 0.05 wt % to about 5.0 wt % fatty acid amide, and about 0.05 wt % to about 5.0 wt % imidazoline. The exemplary processing fluid may include not greater than about 10.0 wt % water, such as not greater than about 5.5 wt % water.

In a further exemplary embodiment, the processing fluid includes about 50 wt % to about 99.9 wt % ethylene glycol, about 0.01 wt % to about 5.0 wt % carboxylic acid functional component, about 0.01 wt % to about 5.0 wt % triazole component, about 0.01 wt % to about 10.0 wt % amine functional component, and about 0.1 wt % to about 5.0 wt % polar component.

The processing fluid generally has electrostatic dissipative properties. In an exemplary embodiment, the processing fluid exhibits conductivity at least about 10 pS/m, such as at least about 100 pS/m or at least about 1.0 pS/m. In a particular embodiment, the processing fluid exhibits conductivity at least about 10 nS/m. For example, the processing fluid may exhibit conductivity at least about 50 nS/m, such as at least about 100 nS/m.

In addition, the processing fluid may have properties, such as viscosity, surface tension, lubricity, and specific gravity, that are conducive for use of the processing fluid in processes, such as lapping, cutting, polishing, or cleaning. In an exemplary embodiment, the processing fluid exhibits Cannon viscosity of about 0.5 cp to about 5 cp. For example, the processing fluid may have Cannon viscosity of about 1.0 cp to about 1.6 cp. In a further exemplary embodiment, the processing fluid exhibits surface tension of about 10 dynes/cm to about 35.0 dynes/cm. For example, the processing fluid may have a surface tension of about 20.0 dynes/cm to about 25.0 dynes/cm. Typically, the processing fluid has a specific gravity of about 0.7 to about 0.9. For example, the processing fluid may have a specific gravity of about 0.75 to about 0.77.

The fluid may be, for example, used in a method of machining an article of manufacture. For example, the fluid may be used in machining process, such as a grinding process, a lapping process or a polishing process, or may be used in a cleaning process. In an example, the machining process includes polishing. In a particular example, the machining process includes lapping. In an exemplary embodiment, the method includes contacting a processing surface of a processing tool to a location on a surface of an article. For example, a processing tool may apply pressure to an area on a surface of an article to be formed into a manufactured component, such as an electronic component. In a particular example, the processing tool is a lapping tool. Processing fluid is provided to the location while the processing tool in contact with or in close proximity to the surface of the article.

In an exemplary embodiment, the processing fluid has a specific gravity of about 0.7 to about 0.9 and a conductivity at least about 10 nS/m. In a fixed abrasive process, the processing tool may include a fixed abrasive surface. In a free abrasive process, the processing fluid may include abrasive particulate, such as diamond particulate.

The method may further include cleaning the surface of the tooled article. For example, a second fluid or a processing fluid without abrasive particulate may be used to remove lingering swarf, cuttings, and abrasive particles.

Particular embodiments of the disclosed fluid have conductivity useful for preventing electrostatic charge build-up in components during processing. Further, particular embodiments of the disclosed fluid have physical properties, such as viscosity and specific gravity, which are desirable for fluids used in processes, such as lapping and polishing, and provide for improved removal rates in such processes. As such, components produced by processes using particular embodiments of the processing fluid exhibit improved surface properties, reduced corrosion, improved electrical performance stability, and desirable electrical response.

EXAMPLES

Expected conductivity values are provided for exemplary processing fluid compositions. Such conductivity values may be measured, for example, at standard conditions (i.e., 25° C.) using a conductivity meter, such as an Emcee Electronics model 1152 conductivity meter or an Orion model 162A conductivity meter. In some examples, 4 processing fluid conductivities are compared with compositions lacking Lewis active components.

Example 1

In an example, a processing fluid is prepared that includes 89.95 wt % non-polar aliphatic hydrocarbon component, 9.0 wt % dipropylene glycol mono butyl ether (glycol ether DPMB), 0.05 wt % Octastat 4065, and 1.0 wt % 9-octadecanoic acid. The exemplary processing fluid has a specific gravity of 0.767 at 20° C., a surface tension of 23.3. dynes/cm at 20° C., and a Cannon viscosity of 1.38 cP at 25° C. The processing fluid includes not greater than 0.05 wt % water.

The exemplary processing fluid has a conductivity of 118 nS/m±16 nS/m. In contrast, a composition including 90.0 wt % non-polar aliphatic hydrocarbon and 10.0 wt % glycol ether DPMB has a conductivity less than the sensitivity of the conductivity meter.

Example 2

In another example, a processing fluid is prepared that includes 75.9 wt % non-polar aliphatic hydrocarbon component, 12.2 wt % ethylene glycol mono hexyl ether (ethylene glycol EH), 2.6 wt % octanoic acid, 0.5 wt % soy amide, 3.8 wt % 1-hydroxyethyl-2-octylimidazoline, and 5.0 wt % water.

The exemplary processing fluid has a conductivity of $2.44 \times 10^6$ nS/m. In contrast, a composition of 86.2 wt % aliphatic hydrocarbon and 13.8 wt % glycol ether EH has a conductivity less than the sensitivity of the conductivity meter.

Example 3

In a further example, a processing fluid is prepared that includes 96.7 wt % ethylene glycol, 0.1 wt % benzoic acid, 0.1 wt % benzotriazole, 3.0 wt % triethanolamine, and 0.1 wt % ethoxylated octylphenol. The exemplary processing fluid has a conductivity of $3.616 \times 10^3$ µS/m.

Example 4

In another example, a processing fluid is prepared that includes 99.201 wt % of the processing fluid of Example 1 and 0.799 wt % 0.12 micron thermally heat treated diamond particles. During preparation, the mixture is sonicated and mixed for 30 minutes. The exemplary processing fluid has a specific gravity of 0.767 at 20° C., a surface tension of 23.3. dynes/cm at 20° C., and a Cannon viscosity of 1.38 cP at 25° C. The exemplary processing fluid has not greater than 0.1 wt % water and has a conductivity of 60 nS/m±10 nS/m.

Example 5

In an additional example, a processing fluid is prepared that includes 99.085 wt % of the processing fluid of Example 1 and 0.915 wt % 0.05 micron thermally heat treated diamond particles. During preparation, the mixture is sonicated and mixed for 30 minutes. The exemplary processing fluid has a specific gravity of 0.767 at 20° C., a surface tension of 23.3. dynes/cm at 20° C., and a Cannon viscosity of 1.38 cP at 25° C. The exemplary processing fluid has not greater than 0.1 wt % water and has a conductivity of 65 nS/m±10 nS/m.

While the invention has been illustrated and described in the context of specific embodiments, it is not intended to be limited to the details shown, since various modifications and substitutions can be made without departing in any way from the scope of the present invention. For example, additional or equivalent substitutes can be provided and additional or equivalent production steps can be employed. As such, further modifications and equivalents of the invention herein disclosed may occur to persons skilled in the art using no more than routine experimentation, and all such modifications and equivalents are believed to be within the scope of the invention as defined by the following claims.

What is claimed is:

1. A processing fluid comprising at least 50.0 wt % of an aliphatic hydrocarbon component having an average chain length of 8 to 16 carbons and about 0.0001 wt % to about 50.0 wt % of a Lewis active component and not greater than about 1.0 wt % water, wherein the processing fluid has conductivity at least about 10 nS/m.

2. The processing fluid of claim 1, wherein the aliphatic hydrocarbon forms about 50.0 wt % to about 99.95 wt % of the processing fluid.

3. The processing fluid of claim 1, wherein the Lewis active component forms about 0.005 wt % to about 10.0 wt % of the processing fluid.

4. The processing fluid of claim 1, wherein the Lewis active component includes a Lewis acid.

5. The processing fluid of claim 1, further comprising a second Lewis active component, wherein the Lewis active component forms one of a Lewis acid and a Lewis base and the second Lewis active component forms the other of a Lewis acid and a Lewis base.

6. The processing fluid of claim 1, wherein the Lewis active component includes a functional group selected from the group consisting of carboxylic acid, amine, imidazole, imidazoline, phosphate, phosphonate, sulfate, sulfonate, polyalkene and salts thereof.

7. The processing fluid of claim 1, further comprising abrasive particulate.

8. The processing fluid of claim 7, wherein the abrasive particulate includes diamond particulate.

9. The processing fluid of claim 7, wherein the abrasive particulate has an average particle size of about 50 nm to about 200 nm.

10. The processing fluid of claim 1, wherein the processing fluid has specific gravity of about 0.7 to about 0.9.

11. The processing fluid of claim 10, wherein the specific gravity is about 0.75 to about 0.77.

12. The processing fluid of claim 1, further comprising about 0.1 wt % to about 50.0 wt % of a polar organic component.

13. The processing fluid of claim 12, wherein the polar organic component is selected from the group consisting of alcohols, amides, ether, and dialkyl sulfides.

14. A lapping fluid comprising at least about 50.0 wt % non-polar hydrocarbon component and not greater than about 1.0 wt % water and having conductance at least about 10 nS/m.

15. The lapping fluid of claim 14, wherein the non-polar hydrocarbon component includes aliphatic hydrocarbon component.

16. The lapping fluid of claim 15, wherein the aliphatic hydrocarbon component includes 8 to 16 carbons.

17. The lapping fluid of claim 14, further comprising not greater than about 25 wt % polar organic component.

18. The lapping fluid of claim 14, further comprising about 0.01 wt % to about 10.0 wt % Lewis active component.

19. The lapping fluid of claim 14, further comprising abrasive particulate.

20. A processing fluid comprising at least about 50 wt % aliphatic hydrocarbon component, about 1.0 wt % to about 25.0 wt % glycol ether component, about 0.005 to about 5.0 wt % ionic polymer component, and about 0.1 wt % to about 5.0 wt % carboxylic acid functional component and not greater than about 1.0 wt % water, wherein the processing fluid has conductivity at least about 10 nS/m.

21. The processing fluid of claim 20, further comprising abrasive particulate.

22. The processing fluid of claim 20, wherein the conductivity is at least about 50 nS/m.

* * * * *